Sept. 20, 1927.
J. MARTIN
BRAKE FOR CREAM SEPARATORS
Filed Sept. 9, 1926
1,642,997
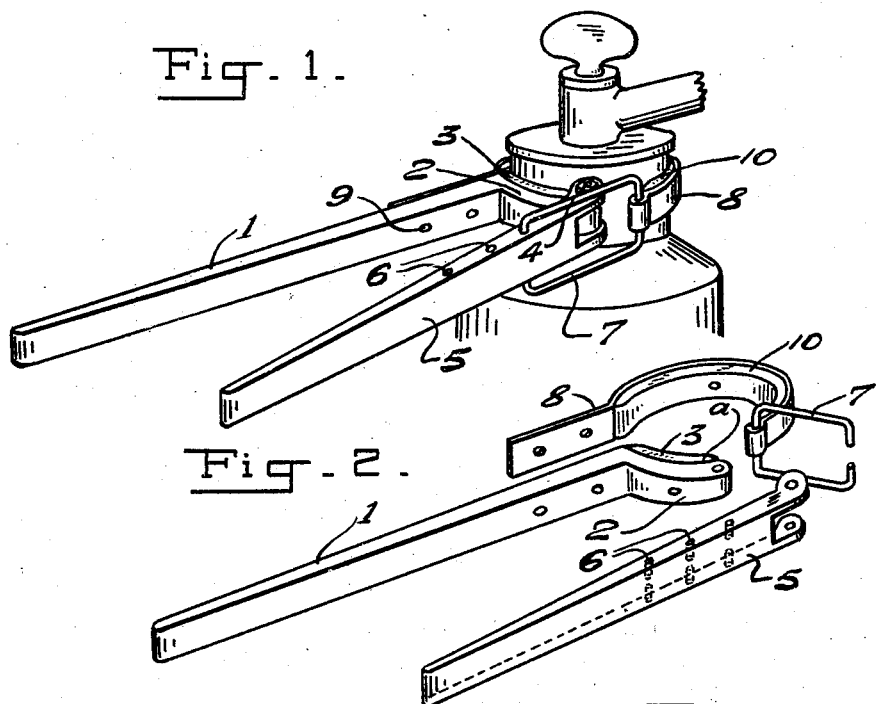
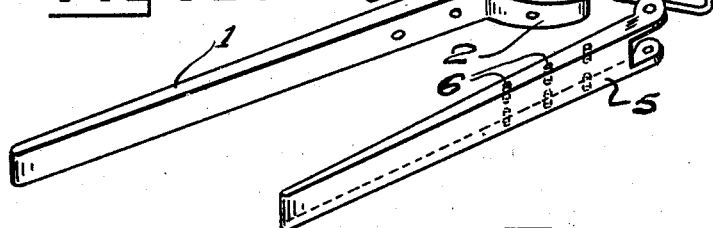
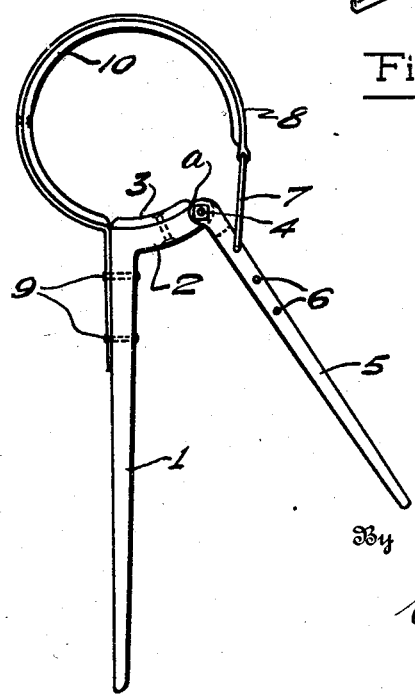
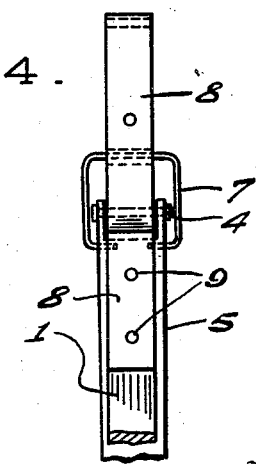
Inventor
John Martin
By Watson E. Coleman.
Attorney Patented Sept. 20, 1927.

1,642,997

UNITED STATES PATENT OFFICE.

JOHN MARTIN, OF AMORITA, OKLAHOMA.

BRAKE FOR CREAM SEPARATORS.

Application filed September 9, 1926. Serial No. 134,488.

This invention relates to brakes for cream separators and it is an object of the invention to provide a brake of this kind which is entirely separable from the cream separator yet can be readily and conveniently engaged therewith to effect the desired braking action.

The invention consists in the details of construction and in the combination and arrangement of the several parts of my improved brake for a cream separator whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawing, wherein:—

Figure 1 is a view in perspective illustrating a brake constructed in accordance with an embodiment of my invention and in applied or working position;

Figure 2 is a view in perspective of the device as herein disclosed with parts in separated relation;

Figure 3 is a view in top plan of the brake as herein set forth;

Figure 4 is a view partly in side elevation and partly in section of the structure as disclosed.

As herein disclosed, my improved brake comprises an elongated main lever 1 provided at one end with a laterally disposed arcuate arm 2 the inbow face $a$ of which being outwardly directed and having disposed thereover a suitable friction lining 3.

Pivotally engaged, as at 4, by a bolt or the like with the outer or free end portion of the arm 2 is an end portion of a lever 5 extending in the same general direction as the lever 1 and adapted to have movement toward or from such lever 1.

This lever 5 is provided therealong with a series of spaced openings 6 with each of which is adapted to be selectively engaged a link 7 carried by the free end portion of a brake band 8. The opposite end portion of this band 8 is bolted, as at 9, or otherwise secured to the lever 1 at a point adjacent to the arm 2. This band 8 is disposed outwardly of or in advance of the arm 2 and the inner face of the band 8 opposed to the arm 2 has secured thereto a brake lining 10.

In practice, my improved brake is adapted to be engaged with the bowl of a cream separator and upon pressure exerted on the levers 1 and 5, the speed of the bowl can be reduced slowly and easily or quickly as desired and the braking action of the arm 2 and the band 8 may be regulated or controlled as desired by the adjustment easily effected of the link 7 lengthwise of the lever 5.

From the foregoing description it is thought to be obvious that a brake for a cream separator constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

A brake mechanism comprising a lever provided at its end with an angularly disposed arm having an arcuately curved outer face, a pliable band applied to the opposite side of said lever and having a curved portion in arcuate alinement with the arcuate face of said arm portion, a second lever connected with the outer end of the arm portion and means for connecting the free end of said band with the intermediate portion of the second mentioned lever.

In testimony whereof I hereunto affix my signature.

JOHN MARTIN.